Dec. 13, 1966      N. O. ROSAEN      3,291,314
BAFFLED CARTRIDGE ASSEMBLY
Filed Nov. 14, 1962
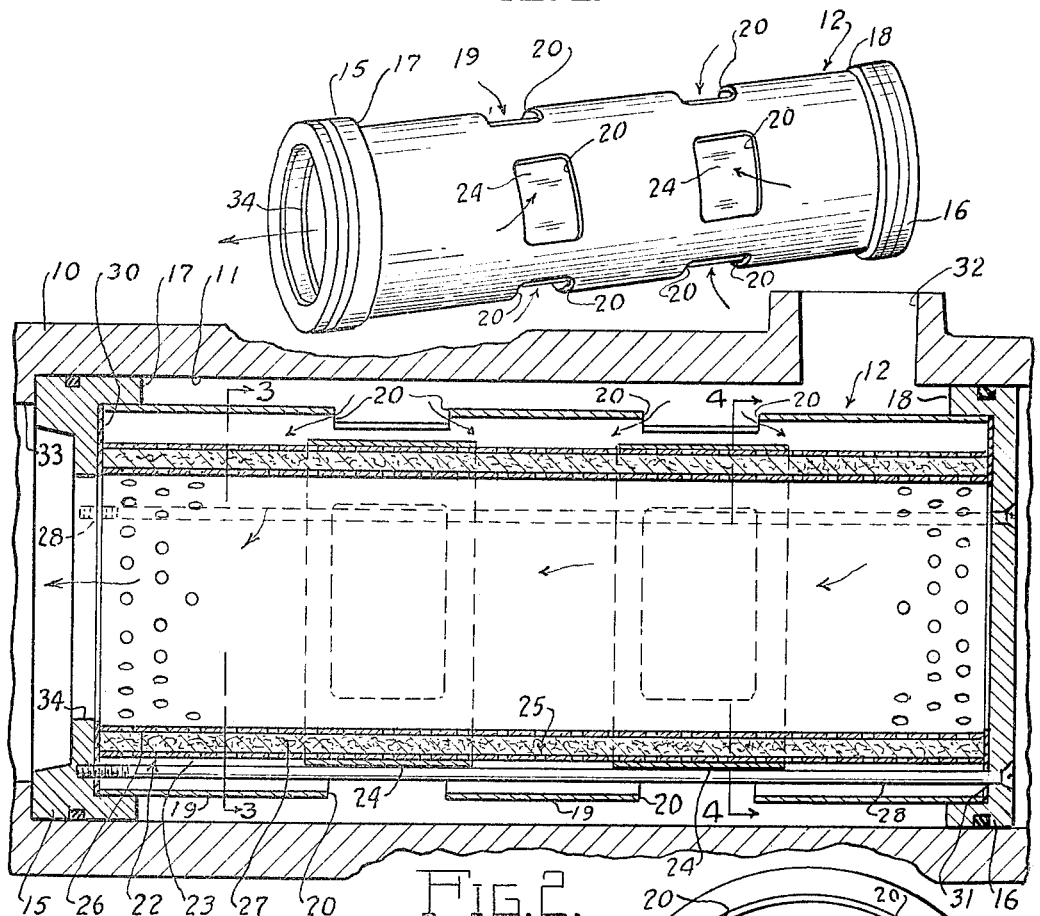
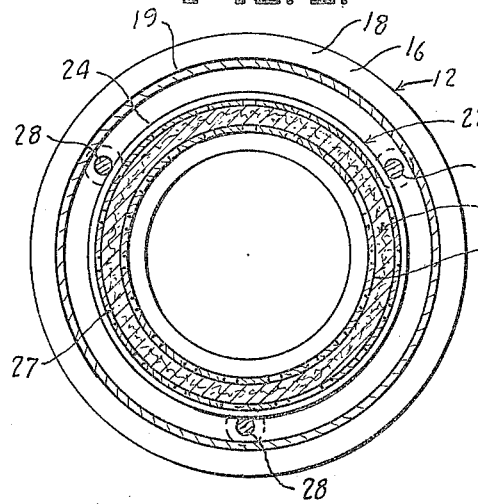
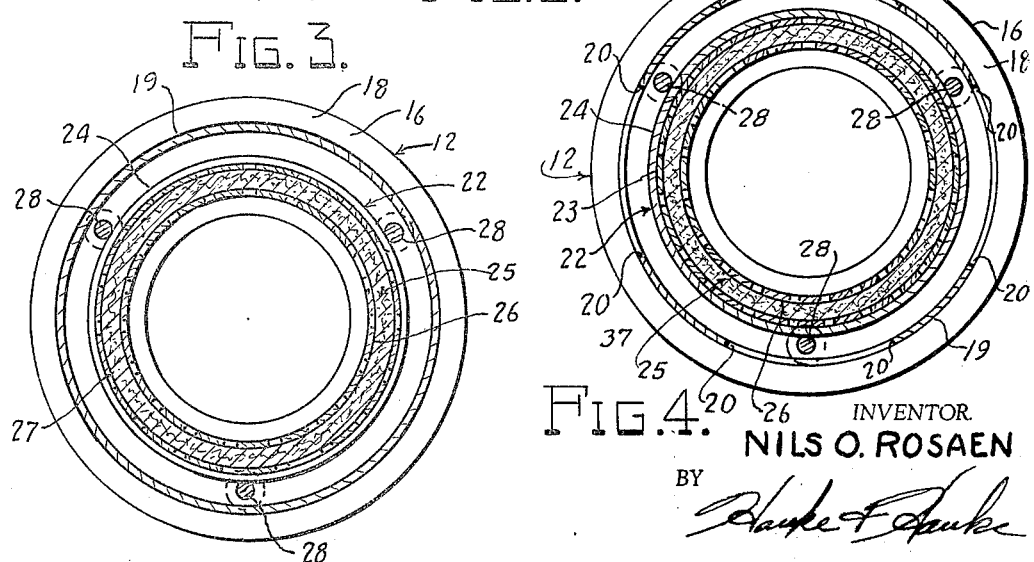
INVENTOR.
NILS O. ROSAEN
BY
Hauke F. Spuhr
ATTORNEYS

United States Patent Office 3,291,314
Patented Dec. 13, 1966

3,291,314
BAFFLED CARTRIDGE ASSEMBLY
Nils O. Rosaen, Bloomfield Hills, Mich., assignor to The Rosaen Filter Company, Hazel Park, Mich., a corporation of Michigan
Filed Nov. 14, 1962, Ser. No. 237,518
2 Claims. (Cl. 210—456)

The present invention relates to fluid filtering cartridges and more particularly to a cartridge assembly for use in filtering high velocity fluids.

Filter cartridge assemblies as they are presently being constructed are unable to long withstand the impact produced by fluids being delivered to the filter at high velocities and it is therefore necessary to shut down high velocity fluid systems at frequent intervals to insert a new cartridge.

It is an object of the present invention to increase the operating time of high velocity fluid systems by providing a filter cartridge assembly having means reducing the velocity of the fluid before it passes through the filter cartridge.

It is another object of the present invention to decrease the costs of operating high velocity fluid systems by providing a filter cartridge assembly having means protecting the cartridge from the impact of the fluids entering the filter at high velocities.

Still further objects and advantages of the present invention will readily occur to one skilled in the art to which the invention pertains upon reference to the following drawings in which like reference characters refer to like parts throughout the several views and in which:

FIG. 1 is a perspective view of a preferred filter cartridge assembly of the present invention, FIG. 2 is a longitudinal cross sectional view of a preferred filter assembly of the present invention, FIG. 3 is a cross sectional view taken substantially on line 3—3 of FIG. 2 but with the housing removed for purposes of clarity, and FIG. 4 is a cross sectional view taken substantially on line 4—4 of FIG. 2 with the housing removed for purposes of clarity.

Now referring to the drawings for a more detailed description of the present invention, FIG. 2 illustrates a preferred filter assembly as comprising a housing 10 having a substantially cylindrical chamber 11 in which a filter cartridge assembly 12 is carried.

The filter cartridge assembly 12 of the present invention is illustrated in FIGS 1–4 as comprising end caps 15–16 each having an annular flange 17–18 respectively which engage with the housing 10 and act to position the cartridge assembly 12 in the chamber 11. A cylindrical outer sleeve 19 is carried by the flanges 17–18 in a position radially inwardly spaced from the housing 10 and is provided with a plurality of axially and annularly spaced openings 20.

A substantially cylindrical inner sleeve 22 is positioned radially inwardly of the outer sleeve 19 and comprises a perforated body portion 23 and substantially cylindrical baffle plates 24. The baffle plates 24 are preferably welded or otherwise secured to the outer surface of the body portion 23 and are axially spaced to be radially aligned with the openings 20. The baffle plates 24 are preferably somewhat longer axially than the axial dimension of the openings 20 as can best be seen in FIG. 2.

A substantially cylindrical filter cartridge 25 is carried in a position radially inwardly of the sleeve 22 and preferably comprises a perforated cylindrical support member 26 and a filter element 27 carried between the sleeve 22 and the member 26.

Annularly spaced bolts 28 are provided between the end caps 15–16 and when tightened urged the ends of the sleeve members 19, 22 and the member 26 into clamping engagement with resilient annular gaskets 30–31. The bolts 28 are positioned intermediate the sleeves 19 and 22. In this manner substantial concentricity of the components of the filter cartridge assembly 12 is maintained.

The housing 10 is provided with a fluid inlet 32 positioned to open to the chamber 11 in an area axially disposed from the openings 20. A fluid outlet 33 is provided in the housing 10 communicating with an outlet port 34 provided in the end cap 15.

In operation, high velocity fluid entering the inlet 32 is deflected circumferentially and axially by the sleeve member 19 and passes through the opening 20. The flow is again diverted axially and circumferentially by the baffle plates 24 and the fluid passes through the perforated body portion 23 at a substantially reduced velocity. Since the fluid passes through the filter cartridge 25 at this reduced velocity damage caused by the impact of the fluid against the cartridge 25 is averted.

Although it is apparent that the reduction in velocity achieved by the assembly of the present invention can be varied by slight variations in the construction, and by way of illustration only, the particular embodiment illustrated has been found to reduce the velocity of the fluid entering the inlet 32 such that after deflecting by the baffle plates 24, its velocity is one-half or less the entering velocity.

It is also apparent that although I have described but one embodiment of the present invention other changes and modifications can be made without departing from the spirit of the invention or the scope of the appended claims.

I claim:

1. In a high velocity fluid system, a filtering device comprising:
    (a) a housing having a substantially cylindrical chamber and an inlet opening radially to said chamber and an outlet opening axially to said chamber,
    (b) a substantially cylindrical filter cartridge assembly carried in said chamber and having an interior portion communicating with said outlet and an exterior portion communicating with said inlet,
    (c) said filter cartridge assembly comprising a substantially cylindrical outer sleeve member spaced radially inwardly from said housing, a substantially cylindrical perforated inner sleeve member disposed concentric with said outer sleeve member and spaced radially inwardly therefrom and a filter element disposed radially inwardly of said inner sleeve member and surrounding said outlet and end caps on opposite ends of said cartridge assembly maintaining said filter element and said sleeve member in concentric relationship,
(d) said outer sleeve member being provided with a plurality of axially and annularly spaced openings,
(e) concentric baffle means carried on the outer surface of said inner sleeve member underlying and in radial alignment with said openings in said outer sleeve member whereby flow from said inlet to said openings in said outer sleeve member is deflected axially by said baffle means before passing through said filter element and said outlet, and
(f) said inlet being positioned to direct flow against the outer surface of said outer sleeve member.

2. A filtering device as defined in claim 1 and in which said baffle means comprises a plurality of axially spaced cylindrical baffle members fixed to the outer surface of said inner sleeve member.

References Cited by the Examiner
UNITED STATES PATENTS

| | | | |
|---|---|---|---|
| 936,464 | 10/1909 | Lucas | 210—336 X |
| 2,728,458 | 12/1955 | Schultz | 210—484 X |
| 2,773,602 | 12/1956 | Sylvester | 210—232 X |
| 2,846,075 | 8/1958 | Thomas | 210—437 X |

REUBEN FRIEDMAN, *Primary Examiner.*

HARRY B. THORNTON, *Examiner.*

F. MEDLEY, *Assistant Examiner.*